US012722692B2

(12) United States Patent
Trönnberg

(10) Patent No.: US 12,722,692 B2
(45) Date of Patent: Sep. 1, 2026

(54) HYDRAULIC POWER STEERING SYSTEM

(71) Applicant: Volvo Truck Corporation, Gothenburg (SE)

(72) Inventor: Gabriel Trönnberg, Trollhättan (SE)

(73) Assignee: Volvo Truck Corporation, Gothenburg (SE)

( * ) Notice: Subject to any disclaimer, the term of this patent is extended or adjusted under 35 U.S.C. 154(b) by 420 days.

(21) Appl. No.: 18/515,435

(22) Filed: Nov. 21, 2023

(65) Prior Publication Data

US 2024/0174287 A1 May 30, 2024

(30) Foreign Application Priority Data

Nov. 29, 2022 (EP) .................................... 22210321

(51) Int. Cl.
*B62D 5/065* (2006.01)
*B62D 5/06* (2006.01)

(52) U.S. Cl.
CPC ............. *B62D 5/065* (2013.01); *B62D 5/063* (2013.01)

(58) Field of Classification Search
CPC ........ B62D 5/063; B62D 5/064; B62D 5/065; B62D 5/30
USPC .......................................................... 180/421
See application file for complete search history.

(56) References Cited

U.S. PATENT DOCUMENTS 4,618,017 A * 10/1986 Liebert .................. B62D 5/063 180/406
7,510,044 B2 * 3/2009 Williams ............... B62D 5/063 180/405
2020/0062302 A1 2/2020 Roos et al.
2022/0135122 A1 * 5/2022 Schacht ................... B62D 5/07 60/403
2024/0092419 A1 * 3/2024 Lang ...................... B62D 5/065

FOREIGN PATENT DOCUMENTS

JP 2016175494 A 10/2016
WO 2018194500 A1 10/2018

OTHER PUBLICATIONS

Extended European Search Report for European Patent Application No. 22210321.0, mailed May 23, 2023, 11 pages.

* cited by examiner

*Primary Examiner* — Valentin Neacsu
*Assistant Examiner* — Felicia L. Brittman-Alabi
(74) *Attorney, Agent, or Firm* — Withrow & Terranova, PLLC

(57) ABSTRACT

A hydraulic power steering system comprising: a first hydraulic pump driven by a rotation of the driving wheels of a vehicle such that a first hydraulic pressure is generated; a second hydraulic pump arranged such that a second hydraulic pressure is generated; a clutch arrangement switchable between an engaged state in which the clutch arrangement is arranged to transmit power from the engine to drive the second hydraulic pump, and a disengaged state in which the clutch arrangement is arranged to disengage power transmission from the engine to the second hydraulic pump; and a hydraulic power steering arrangement to be connected to a steering system of the vehicle to amplify steering input exerted by a driver by applying a hydraulic pressure provided by the first and/or second hydraulic pressure.

13 Claims, 5 Drawing Sheets

112
106
127
120
116
104
100
126

HYDRAULIC POWER STEERING SYSTEM

PRIORITY APPLICATIONS

The present application claims priority to European Patent Application No. 22210321.0, filed on Nov. 29, 2022, and entitled "HYDRAULIC POWER STEERING SYSTEM," which is incorporated herein by reference in its entirety.

TECHNICAL FIELD

The disclosure relates generally to steering of vehicles. In particular aspects, the disclosure relates to a hydraulic power steering system. The disclosure can be applied in heavy-duty vehicles, such as trucks, buses, and construction equipment. Although the disclosure may be described with respect to a particular vehicle, the disclosure is not restricted to any particular vehicle.

BACKGROUND

Hydraulic power steering systems are generally used in vehicles for efficient steering of the vehicles. This is achieved by the hydraulic power steering system being arranged to multiply forces applied to the steering wheel by the driver. In more detail, the hydraulic power steering system uses flow of hydraulic fluid to amplify the force applied to turn the front wheels of the vehicle. Put differently, when the steering wheel is turned by the driver the hydraulic pressure is applied to the steering system exerting the needed force to turns the wheels. The harder the driver turns the steering wheel the more fluid flows and the larger force is applied to the wheels. The hydraulic fluid is pressurized by a hydraulic pump driven, typically, by the vehicle engine which allows even larger and heavier vehicles to be effortlessly maneuvered by the driver.

To effortlessly steer the vehicle is safety critical since if the driver has no power steering assistance he or she may not be able to perform, e.g., evasive steering manoeuvres to avoid obstacles in the road or to adjust efficiently the driving to changes in the traffic situation. A loss of steering assistance may therefore put the vehicle as well as the surroundings at risk. There is therefore a need for improved hydraulic power steering systems. There is further a desire to provide fail-safe solutions while ensuring efficient steering of vehicles.

To this end there is further a constant need to improve fuel efficiency to allow for more energy efficient transportation with a smaller environmental footprint. One solution for improving transportation efficiency of vehicles is, for example, to include functionalities such as a controlled turning off of the engine when engine power to propel the vehicle is not required such as at standstill. Another functionality implemented is that the engine may be declutched in the transmission, e.g., via the gearbox, to eliminate driveline drag during situations when propulsion power is not needed. This allows the vehicle to roll more efficiently which improves the fuel economy. It is even possible to turn off the vehicle engine when the vehicle is at speed. The engine may in such a situation be inactive for a considerable amount of time, for example, during a long downhill slope when no forward momentum is required to be generated by the engine. An increased energy efficiency may thereby be reached but the procedure requires, however, that the power steering assistance is maintained when the engine is turned off.

One solution found today is to use two hydraulic pumps. To have two hydraulic pumps connected all the time, however, reduces the energy efficiency of the vehicle. There is therefore a need to further develop more flexible hydraulic power steering systems.

SUMMARY

According to a first aspect of the disclosure, a hydraulic power steering system for a vehicle is provided. The hydraulic power steering system being for a vehicle having an engine for propelling the vehicle and a transmission output shaft for carrying power generated by the engine to drive driving wheels of the vehicle. The hydraulic power steering system comprising: a first hydraulic pump arranged to be mechanically driven by the transmission output shaft such that the first hydraulic pump is driven by a rotation of the driving wheels when the vehicle is in motion such that a first hydraulic pressure is generated; a second hydraulic pump arranged to be mechanically driven by power provided by the engine such that a second hydraulic pressure is generated; a clutch arrangement for mechanically connecting the second hydraulic pump with the engine, the clutch arrangement being switchable between an engaged state in which the clutch arrangement is arranged to transmit power from the engine to drive the second hydraulic pump, and a disengaged state in which the clutch arrangement is arranged to disengage power transmission from the engine to the second hydraulic pump; and a hydraulic power steering arrangement in fluid connection with the first and the second hydraulic pump; wherein the hydraulic power steering arrangement is arranged to be connected to a steering system of the vehicle to amplify steering input exerted by a driver of the vehicle to a steering wheel of the steering system by applying a hydraulic pressure provided by the first and/or second hydraulic pressure to the hydraulic power steering arrangement.

The first aspect of the disclosure may seek to provide fail-safe power steering assistance for a driver of the vehicle. A technical benefit may be that a hydraulic power steering system is provided that may be used in a broader range of situations in which it would be safety critical to not lose steering assistance for the driver. A more flexible hydraulic power steering system may therefore be provided. A further technical benefit may include that a cost and energy efficient system for power steering is provided. The provided hydraulic power steering system may allow for the use of less complex parts.

The wording hydraulic power steering system may be construed as a closed loop system that uses pressurized hydraulic fluids for amplifying a driver's input exerted on a steering wheel for changing a driving direction of a vehicle. The change of driving direction pertains to a steering angle change of the driving wheel angle as a result of the angular rotation of the steering wheel. The change of driving wheel angle may to the front driving wheels of the vehicle. Put differently, the hydraulic power steering system may be understood as a hydro-mechanical servo system that applies force in a similar direction as the driver, but with greater torque. The first pump and second pump may respectively be understood as a servo pump. The wording fluidic connection may be construed as a connection comprising hydraulic fluid which is pressurized by a the first and/or second hydraulic pump. This provides hydraulic pressure to the steering system.

The wording transmission output shaft may be construed as a component that carries power out of the transmission to the driving wheels of the vehicle. The transmission output shaft may form part of a transmission system of the vehicle. Put differently, the transmission system may be an arrangement of elements arranged to transfer power generated by the engine to the driving wheels for propelling the vehicle.

In some examples, the first hydraulic pump is continuously driven by the rotation of the driving wheels when the vehicle is in motion. A technical benefit may include a less complex arrangement for driving the first hydraulic pump. An improved fail-safe hydraulic power steering arrangement may further be provided. An accidental discontinuation of the driving of the first hydraulic pump may be prevented.

In some examples, the engine may be a combustion engine. The combustion engine may be referred to as an internal combustion engine. The combustion engine may be a fuel engine or a hybrid engine. The combustion engine may be a gasoline engine, a diesel engine, a gas engine or a biofuel driven engine. The combustion engine may be a hydrogen engine. The hydrogen engine may be referred to as a hydrogen internal combustion engine.

In some examples, the clutch arrangement may be a bi-stable clutch arrangement. The bi-stable clutch arrangement may also be referred to as a flip-flop clutch. A technical benefit may include that the bi-stable clutch arrangement allows a state, such as an engaged or a disengaged state, to be maintained over time without need for additional power to be fed to the clutch arrangement. Put differently, the bi-stable clutch arrangement, maintains a status, i.e., open or closed, with zero additional power feed to the bi-stable clutch arrangement. A further technical benefit may be that a more energy efficient hydraulic power steering system may be provided. In other words, this may lead to efficiency benefits, i.e., less electric power is consumed. A switching of state requires, however, power but the switching time may be reduced compared to conventional fail-safe clutch arrangements. The power applied to switch the state may be electrical or mechanical power. The switching may be achieved by a low power pulse designed solely to change the switching status. There may further not be any need for a 'hold current' required by more complex fail-safe clutch arrangements. There may further be a reduction in cost and complexity due to the simpler electronic solution for controlling the bi-stable clutch arrangement. As an example, the hydraulic power steering system may require less electric power to keep the system fail-safe.

In some examples, the clutch arrangement is an electromagnetic clutch arrangement. A technical benefit may include that the control of the switching of the clutch arrangement may be simplified.

In some examples, the hydraulic power steering system may further comprise an engine control system arranged control the switching between the engaged state and the disengaged state.

In some examples, the engine control system may be construed as a central controller forming part of an engine management system. The electronic engine control system may in some examples be referred to as an engine control module. The electronic control system may further comprise one or more engine control units. The wording control system may be understood as a system configured to determine and/or control a state of a device or a system. The device may, as exemplified here, be a hydraulic pump. The control system may comprise one or more control units. The wording control unit may be understood as a unit configured to handle control signals, such as processor control signals. The control unit may comprise circuitry for executing computer instructions. The control unit may further direct and/or determine input and output parameters, receive and/or send instructions to run computer code. The control unit may also be configured to monitor and/or direct other units and/or devices by control and timing signals. The control unit may comprise a transceiver.

In some examples, the engine control system may be arranged to receive a control signal from a control system of the vehicle, wherein the control signal is based on sensor data pertaining to a state of the vehicle and/or position data pertaining to a position of the vehicle and wherein the point in time for switching of state of the clutch arrangement is based on the control signal. A technical benefit may include that the energy consumption for propelling the vehicle is reduced. A more cost-efficient transportation may thereby be provided. By utilizing sensor data such as data pertaining to the acceleration, drive wheel speed, vehicle inclination, and or transmission and engine characteristics pertaining to the operation of the vehicle efficient planning and/or timing of the switching of state of the clutch arrangement may be provided. By utilizing position data such as the global position, for instance from a global positioning system and/or from map data, efficient planning and/or timing of the switching of state of the clutch arrangement may also be provided. Internal factors pertaining to the vehicle itself and/or external factors pertaining to the environment of the vehicle, such as traffic situation, road conditions etc. which may influence the safety may moreover be considered.

In some examples, the clutch arrangement may be in the engaged state and the engine may be in operation and wherein the hydraulic pressure is solely caused by second hydraulic pressure generated by the second hydraulic pump when the vehicle is at standstill. A technical benefit may include providing efficient power steering assistance when the vehicle is at standstill.

In some examples, the clutch arrangement is in the disengaged state, and wherein the hydraulic pressure is solely caused by the first hydraulic pressure generated by the first hydraulic pump when the vehicle is in motion. A technical benefit may include efficient power steering assistance. A further technical benefit may be that the rotation of the driving wheels may solely drive the first hydraulic pump. A technical benefit may include that an improved fail-safe hydraulic power steering system may be provided. A more energy efficient transportation may further be achieved.

In some examples, the clutch arrangement may be in the disengaged state, and wherein the hydraulic pressure may be solely caused by the first hydraulic pressure generated by the first hydraulic pump when the vehicle is in motion while the engine is turned off. An improved fail-safe hydraulic power steering system may thereby be provided for power steering assistance to the driver of the vehicle without the need to have the engine running. A further reduction in energy consumption during transportation may be achieved. An improved fail-safe hydraulic power steering system may further be provided for power steering assistance to the driver of the vehicle when the engine should be turned off.

In some examples, the clutch arrangement may be in the engaged state, and wherein the engine may be in operation, wherein the hydraulic pressure is combinedly caused by the first and second hydraulic pressure generated respectively by the first and second hydraulic pump when the vehicle is in motion. A technical advantage may be that when the engine is driving the vehicle the pressure may be generated combinedly by the first and second hydraulic pumps. Efficient power steering assistance to a driver of the vehicle may further be achieved for instance at low speed where only the hydraulic pressure provided by the first pump may not be sufficient enough for efficient creation of the hydraulic pressure for providing the power steering assistance.

In some examples, the vehicle may further comprise a transmission clutch arrangement, in mechanical contact with the engine and the transmission output shaft, the transmission clutch arrangement being arranged to switch between an engaged state in which the engine and the transmission output shaft are in mechanical contact such that power from the engine is transmitted to the transmission output shaft and a disengaged state in which the transmission clutch arrangement is arranged to disengage power transmission from the engine to the transmission output shaft. A technical benefit may include to provide a more energy efficient vehicle. The disengaged state of the transmission clutch may, for example, eliminate driveline drag pertaining to the propulsion system of the vehicle when propulsion power is not needed.

The wording transmission clutch arrangement may be construed as a mechanical device arranged to engage or disengages power transmission, from the engine to the transmission output. According to some examples, the transmission clutch arrangement may be arranged to engage or disengage a drive shaft and a driven shaft. The transmission output arrangement may comprise the driven shaft. The transmission clutch arrangement may be in the form of a clutch that connect and disconnect two rotating shafts. The transmission clutch arrangement may alternatively be a linear clutch.

Put differently, the transmission clutch arrangement may provide a mechanical connection between the engine and transmission output. When the transmission clutch arrangement is in an engaged state the engine is mechanically connected to the transmission. When the transmission clutch arrangement is in a disengaged state the engine may be mechanically disconnected from the transmission. This disconnects the drive wheels from the engine allowing for a free rolling of the driving wheels.

According to a second aspect of the disclosure a vehicle comprising the hydraulic steering system may be provided. The above-mentioned features of the hydraulic power steering system, when applicable, apply to this second aspect as well. In order to avoid undue repetition, reference is made to the above.

In some examples, the vehicle may be a heavy-duty vehicle, a medium-duty vehicle or a bus.

In some examples, the vehicle may be a light-duty vehicle.

According to a third aspect of the disclosure a method for operating a hydraulic power steering system of a vehicle, the vehicle having an engine for propelling the vehicle and a transmission output shaft for carrying power generated by the engine to drive driving wheels of the vehicle, is provided. The method comprising; generating a first pressure by driving, when the vehicle is in motion, a first hydraulic pump, the first hydraulic pump being arranged to be mechanically driven by the transmission output shaft such that the first hydraulic pump is driven by a rotation of the driving wheels; generating a second hydraulic pressure by driving a second hydraulic pump, the second hydraulic pump being mechanically driven by power provided by the engine; and amplifying steering input exerted to a steering wheel of the vehicle by a driver of the vehicle, by applying a hydraulic pressure caused by the first and/or second hydraulic pressure to a hydraulic power steering arrangement, the hydraulic power steering arrangement being in fluid connection with the first and the second hydraulic pump; wherein the hydraulic power steering system further comprises a clutch arrangement for mechanically connecting the second hydraulic pump with the engine, wherein the clutch arrangement is switchable between an engaged state in which the clutch arrangement is arranged to transmit power from the engine to drive the second hydraulic pump, and a disengaged state in which the clutch arrangement is arranged to disengage power transmission from the engine to the second hydraulic pump; wherein the method further comprises: switching the clutch arrangement between the engaged state and the disengaged state. The third aspect of the disclosure may seek to provide fail-safe power steering assistance for a driver of the vehicle. A more flexible hydraulic power steering system may therefore be provided. A further technical benefit may include that a cost and energy efficient system for power steering is provided. The above-mentioned features pertaining to the first and second aspects, when applicable, apply also to this third aspect. In order to avoid undue repetition, reference is made to the above.

In some examples, wherein the hydraulic power steering system further comprises an engine control system, the method may further comprise: receiving, a control signal from a control system of the vehicle, wherein the control signal is based on sensor data pertaining to a state of the vehicle and/or position data pertaining to a position of the vehicle by the engine control system; and switching the state of the clutch arrangement based on the control signal.

In some examples, the method may further comprise: switching, when the vehicle is at standstill and the engine is in operation, the clutch arrangement to the engaged state such that the hydraulic pressure is solely caused by second hydraulic pressure generated by the second hydraulic pump.

In some examples, the method may further comprise: switching, when the vehicle is in motion, the clutch arrangement to the disengaged state such that the hydraulic pressure is solely caused by the first hydraulic pressure generated by the first hydraulic pump.

In some examples, the method may further comprise: switching, when the vehicle is in motion, and the engine is turned off, the clutch arrangement to the disengaged state such that the hydraulic pressure is solely caused by the first hydraulic pressure generated by the first hydraulic pump.

In some examples, wherein the vehicle further comprising a transmission clutch arrangement, in mechanical contact with the engine and the transmission output shaft, the method may further comprise: switching the transmission clutch arrangement being switch between an engaged state in which the engine and the transmission output shaft are in mechanical contact such that power from the engine is transmitted to the transmission output shaft and a disengaged state in which the transmission clutch arrangement is arranged to disengage power transmission from the engine to the transmission output shaft.

The method may further comprise: turning the engine off and switching, when the vehicle is in motion, the clutch arrangement to the disengaged state.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

Figure 1:
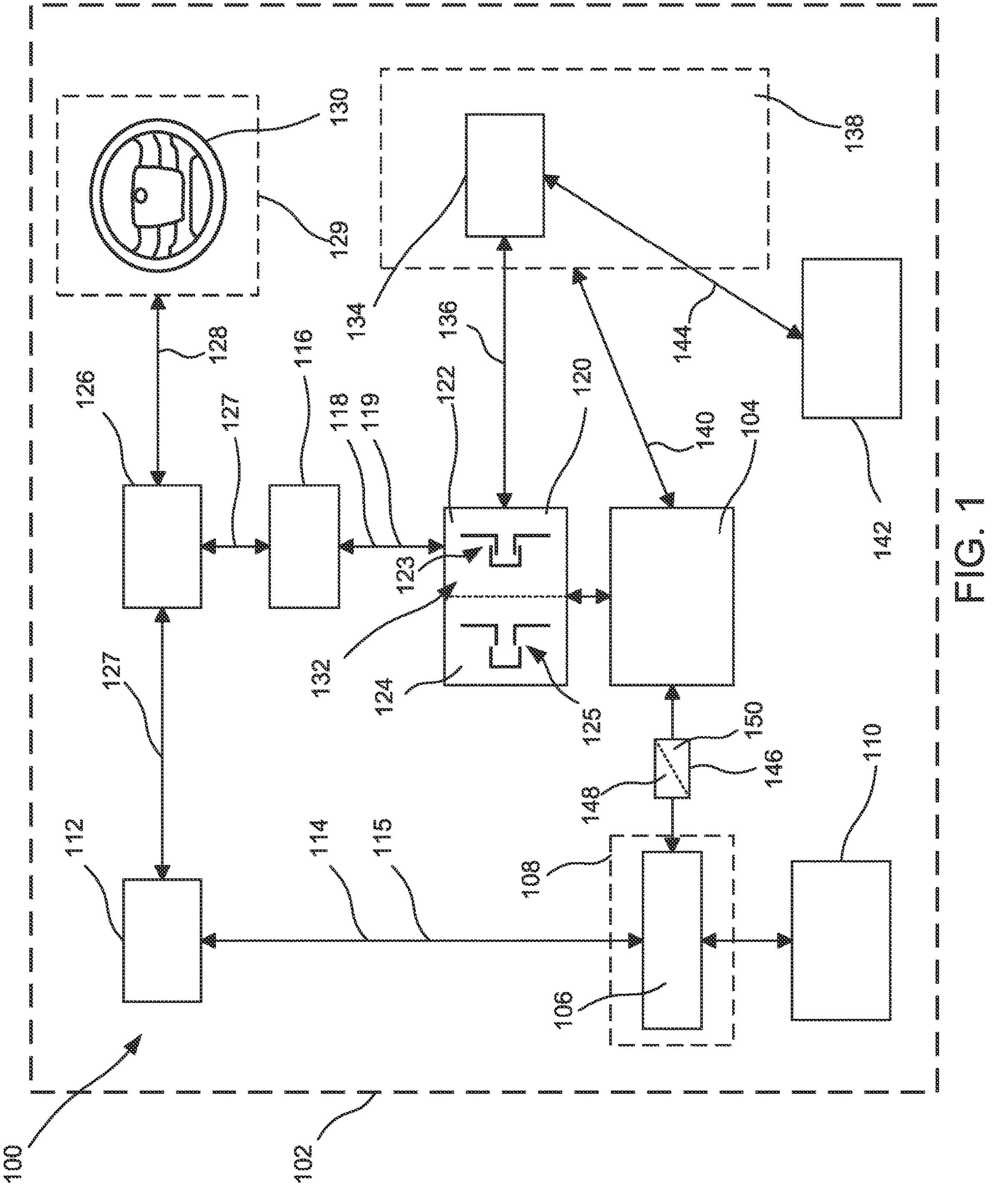
FIG. 1 is an exemplary schematic illustration of a hydraulic power steering system for a vehicle according to one example.

FIG. 1 is an exemplary schematic illustration of a hydraulic power steering system for a vehicle according to one example. The hydraulic power steering system 100 is provided for a vehicle 102 having an engine 104. The engine 104 may be a combustion engine. The engine 104 may be referred to as an internal combustion engine. The engine 104 is configured to propel the vehicle 102. The vehicle 102 comprises the hydraulic power steering system 100.

The vehicle 102 further comprises a transmission output shaft 106. The transmission output shaft 106 may form part of a transmission system 108 of the vehicle 102. The transmission output shaft 106 may be arranged to carry power generated by the engine 104 to drive driving wheels 110 of the vehicle 102. The driving wheels 110 that are driven may be referred to as drive wheels. The hydraulic power steering system 100 comprises a first hydraulic pump 112. The first hydraulic pump 112 is arranged to be mechanically driven by the transmission output shaft 106 such that the first hydraulic pump 112 is driven by a rotation of the driving wheels 110 when the vehicle 102 is in motion such that a first hydraulic pressure 114 is generated. The hydraulic power steering system 100 may further comprise a second hydraulic pump 116 arranged to be mechanically driven by power provided by the engine 104 such that a second hydraulic pressure 118 is generated. The first hydraulic pump 112 may be in mechanical connection 115 with the transmission output shaft 106. The second hydraulic pump 116 may be in mechanic connection 119 with the engine 104. The hydraulic power steering system 100 may comprise hydraulic fluid that may be pressurized by the first 112 or second 116 hydraulic pump. The hydraulic power steering system 100 may form part of a single fluidic system. The fluidic system may further comprise a fluid reservoir holding fluid.

The hydraulic power steering system 100 may further comprise a clutch arrangement 120 for mechanically connecting the second hydraulic pump 116 with the engine 104. The clutch arrangement 120 being switchable between an engaged state 122 in which the clutch arrangement 120 is arranged to transmit power 123 from the engine 104 to drive the second hydraulic pump 116, and a disengaged state 124 in which the clutch arrangement 120 is arranged to disengage power transmission 125 from the engine 104 to the second hydraulic pump 116.

The hydraulic power steering system 100 may further comprise a hydraulic power steering arrangement 126. The hydraulic power steering arrangement 126 is in fluid connection 127 with the first 112 and the second 116 hydraulic pump. The hydraulic power steering arrangement 126 is arranged to be connected 128 to a steering system 129 of the vehicle 102 to amplify steering input exerted by a driver of the vehicle 102 to a steering wheel 130 of the steering system 129 by applying a hydraulic pressure provided by the first 112 and/or second 116 hydraulic pressure to the hydraulic power steering arrangement 126. A technical benefit may be that a hydraulic power steering system 100 is provided that may be used in a broader range of situations in which it would be safety critical to not lose steering assistance for the driver. A more flexible hydraulic power steering system 100 may be provided.

The first hydraulic pump 112 may be continuously driven by the rotation of the driving wheels 110 when the vehicle 102 is in motion. Put differently, a rotation of the driving wheels 110 will induce a driving force to the first hydraulic pump 112.

The clutch arrangement 120 may be a bi-stable clutch arrangement 132. A technical benefit may include that the bi-stable clutch arrangement allows the engaged 122 or a disengaged 124 state, to be maintained over time without need for additional power to be fed to the clutch arrangement 120. The clutch arrangement 120 may be an electromagnetic clutch.

The hydraulic power steering system 100 may comprise an engine control system 134 arranged control 136 the switching between the engaged state 122 and the disengaged state 124. The engine control system 134 may form part of an engine management system 138. The engine management system 138 being connected 140 to the engine 104. The engine management system 138 may be configured to monitor and/or control the engine 104.

The engine control system 134 may be arranged to receive a control signal 144 from a control system 142 of the vehicle 102. The control signal 144 may be based on sensor data pertaining to a state of the vehicle 102 and/or position data pertaining to a position of the vehicle 102. A point in time for switching of state 122, 124 of the clutch arrangement 120 may be based on the control signal 144.

The vehicle 102 may further comprise a transmission clutch arrangement 146. The transmission clutch arrangement 146 may be in mechanical contact with the engine 104 and the transmission output shaft 106. The transmission clutch arrangement 146 may be arranged to switch between an engaged state 148 in which the engine 104 and the transmission output shaft 106 are in mechanical contact such that power from the engine 104 is transmitted to the transmission output shaft 106 and a disengaged state 150 in which the transmission clutch arrangement 146 is arranged to disengage power transmission from the engine 104 to the transmission output shaft 106.

Figure 2:
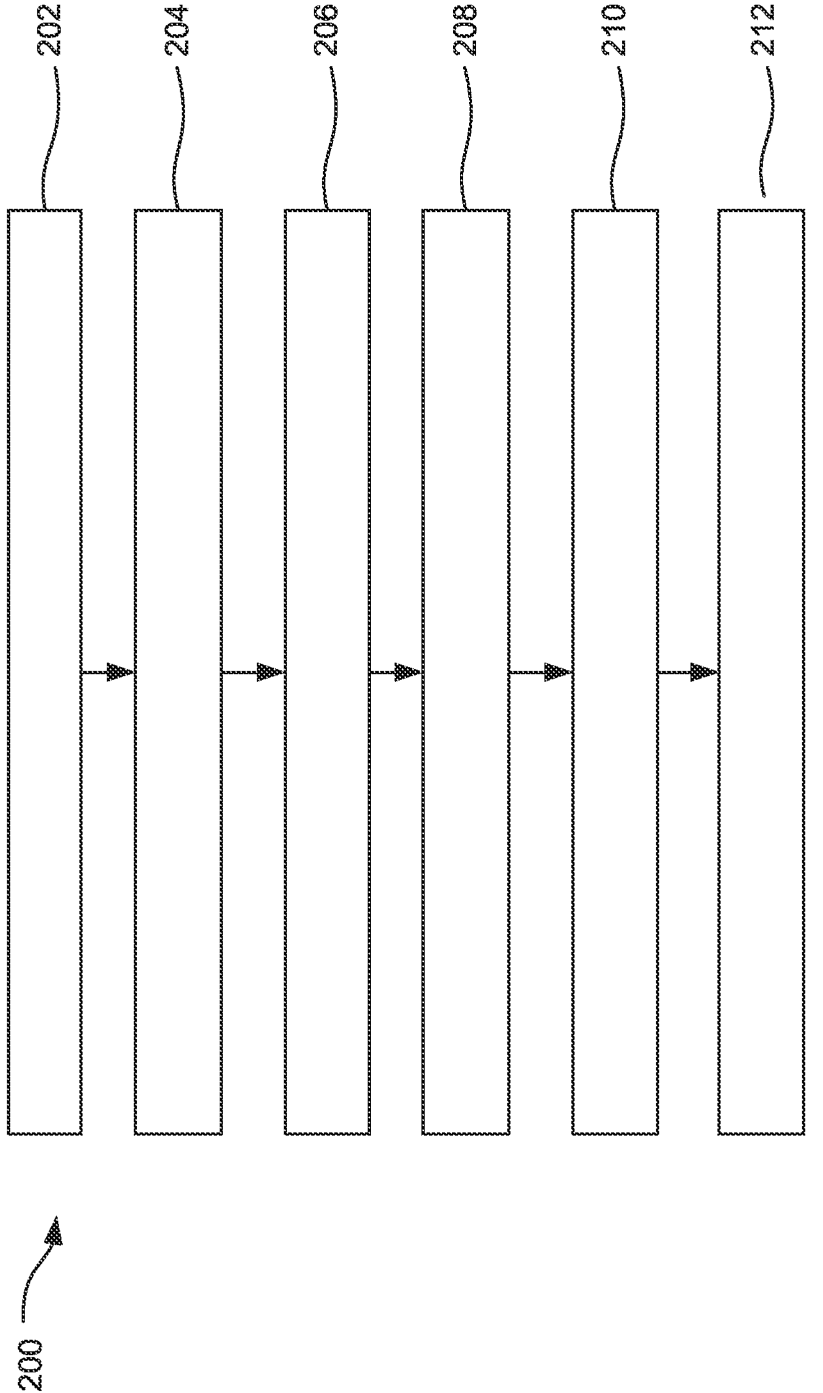
FIG. 2 is a flow chart of an exemplary method for operating a hydraulic power steering system of a vehicle.
Figure 3:
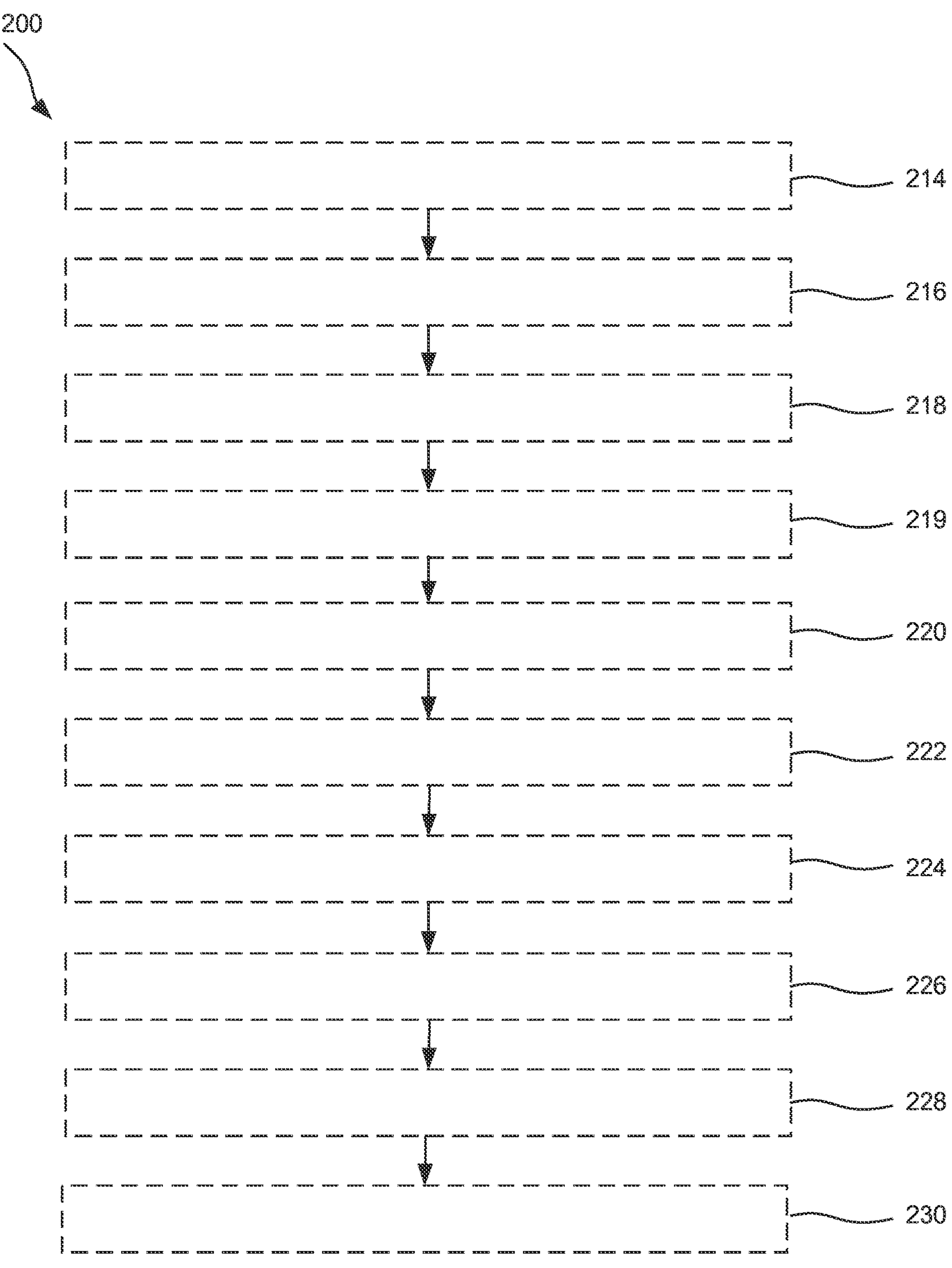
FIG. 3 is a further flow chart of an exemplary method for operating a hydraulic power steering system of a vehicle.
Figures 4A, 4B:
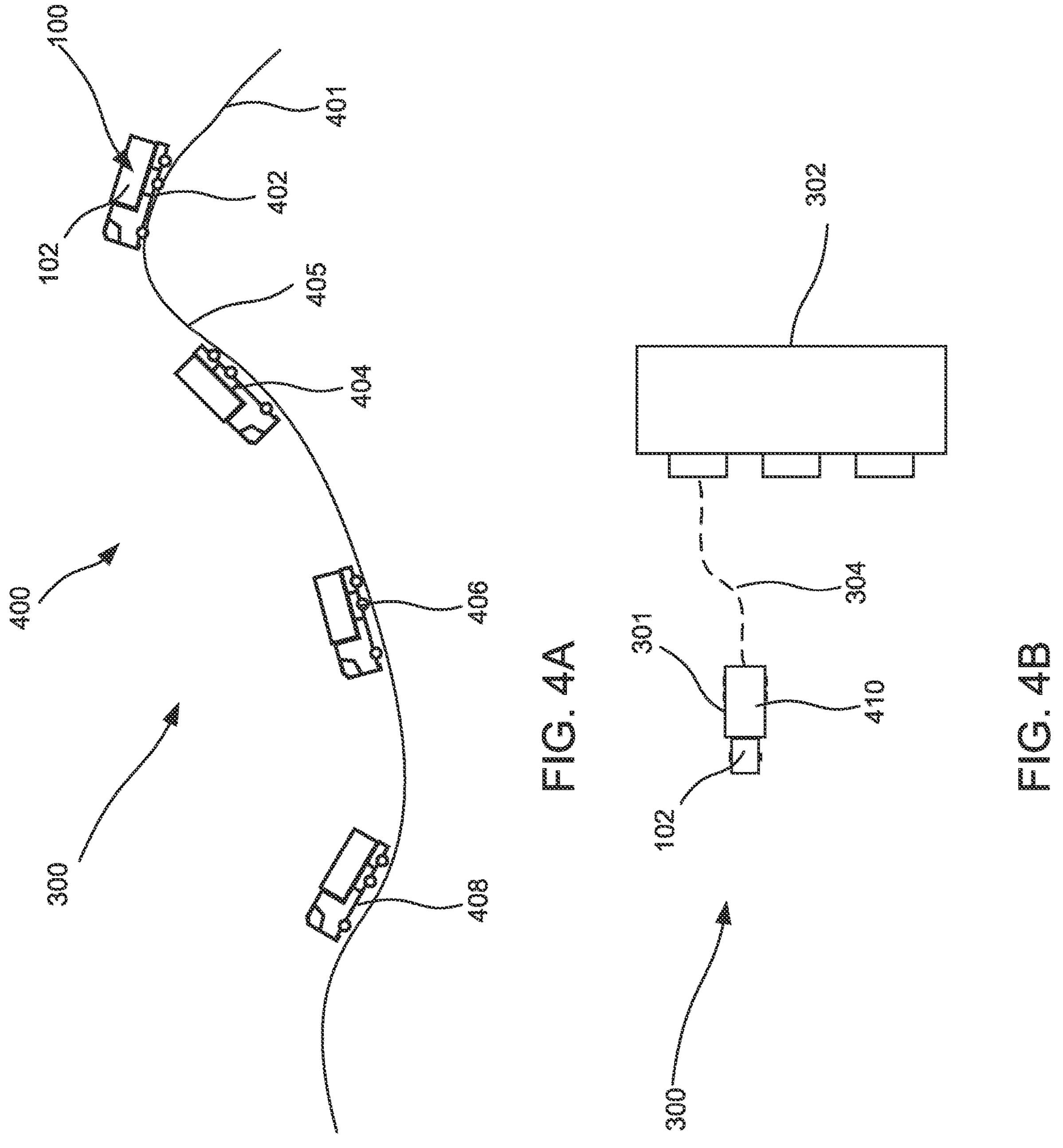
FIGS. 4A and 4B are exemplary applications of the hydraulic power steering system for a vehicle.

FIGS. 2 and 3 are a flow chart of an exemplary method 200 for operating a hydraulic power steering system of a vehicle. FIGS. 4A and 4B are exemplary applications 300 of the hydraulic power steering system 100 for the vehicle 102. The vehicle 102 is here exemplified as a heavy-duty vehicle. The vehicle 102 may, in other examples, be a medium-duty vehicle or a light-duty vehicle. The vehicle may, for example, be a bus. With reference to FIGS. 2, 3, 4A and 4B, the method 200 comprises; generating 202 a first pressure by driving 204, when the vehicle 102 is in motion, a first hydraulic pump, the first hydraulic pump being arranged to be mechanically driven by the transmission output shaft such that the first hydraulic pump is driven by a rotation of the driving wheels. The method 200 further comprises generating 206 a second hydraulic pressure by driving 208 a second hydraulic pump, the second hydraulic pump being mechanically driven by power provided by the engine; and amplifying 210 steering input exerted to a steering wheel of the vehicle by a driver of the vehicle 102, by applying a hydraulic pressure caused by the first and/or second hydraulic pressure to a hydraulic power steering arrangement. The hydraulic power steering arrangement 100 is in fluid connection with the first and the second hydraulic pump. The hydraulic power steering system 100 further comprises a clutch arrangement for mechanically connecting the second hydraulic pump with the engine, wherein the clutch arrangement being switchable between an engaged state in which the clutch arrangement is arranged to transmit power from the engine to drive the second hydraulic pump, and a disengaged state in which the clutch arrangement is arranged to disengage power transmission from the engine to the second hydraulic pump. The method 200 further comprises: switching 212 the clutch arrangement between the engaged state and the disengaged state. A more flexible hydraulic power steering system may therefore be provided. A further technical benefit may include that a cost and energy efficient system for power steering is provided. In FIG. 4A vehicle 102 comprising the hydraulic power steering system 100 is illustrated in four different situations 400 according to one example of the use of the method 200. In the first situation 402 the vehicle 102 has climbed a hill slope 401. The engine is in operation, the driving wheels are rotating, and the clutch arrangement is in the engaged state. An amplification of a steering input exerted to a steering wheel of the vehicle 102 by the driver of the vehicle 102 is provided as a hydraulic pressure is caused by the first and second hydraulic pressures to the hydraulic power steering arrangement 100. In more detail the hydraulic pressure is generated by a first pressure by the first hydraulic pump. The first hydraulic pump is mechanically driven by the transmission output shaft. The first hydraulic pump is therefore driven by the rotation of the driving wheels. The second hydraulic pressure is generated by the second hydraulic pump. The power for the second hydraulic pump is provided by the engine. In more detail, in situation 402 where the engine is in operation and the vehicle 102 is in motion, the clutch arrangement is in the engaged state. The hydraulic pressure is thereby combinedly created by the first and second hydraulic pressure. The first and the second hydraulic pressure being generated by the first and second hydraulic pump, respectively. A technical advantage may be that when the engine is driving the vehicle the pressure may be generated combinedly by the first and second hydraulic pumps. Efficient power steering assistance to a driver of the vehicle may further be achieved for instance at low speed where only the hydraulic pressure provided by the first pump may not be sufficient enough for efficient creation of the hydraulic pressure for providing the power steering assistance.

In the second situation 404, the vehicle 102 is in motion and is starting to come down a longer slope 405. The method 200 may further comprise switching 214 the clutch arrangement to the disengaged state such that the hydraulic pressure is solely caused by the first hydraulic pressure generated by the first hydraulic pump. A technical benefit may include efficient power steering assistance. A further technical benefit may be that the rotation of the driving wheels may drive the first hydraulic pump. A driving of the second hydraulic pump may therefore not be needed in situation 404. A technical benefit may include that an improved fail-safe hydraulic power steering system may be provided. A more energy efficient transportation may further be achieved. Hence only one hydraulic pump may be in operation to provide the steering assistance. A more energy efficient steering is thereby provided.

The hydraulic power steering system 100 of the vehicle 102 may further comprise an engine control system. The method 200 may comprise receiving 216, a control signal from the control system of the vehicle, wherein the control signal is based on sensor data pertaining to a state of the vehicle and/or position data pertaining to a position of the vehicle by the engine control system; and switching 218 the state of the clutch arrangement based on the control signal. The switching 218 may be to the disengaged state. By using sensor data and/or position data the switching may be automatic. The switching 218 may thereby be made more efficiently. The switching 218 may be predetermined such that the switching is performed based on sensor data and/or position data. The state or the position of the vehicle 102 may thereby be used to determine when to perform the switching 218. A more energy favorable transportation may thereby be obtained. The switching 218 may for example be planned ahead such as when the vehicle is in position 402 or when the vehicle 102 has reached a longer downward slope. An improved power steering assistance to the driver may be provided. A safer driving of the vehicle is further provided. Put differently, by utilizing sensor data such as data pertaining to the acceleration or deacceleration, drive wheel speed, vehicle inclination, and or transmission and engine characteristics pertaining to the operation of the vehicle efficient planning and/or timing of the switching of state of the clutch arrangement may be provided. By utilizing position data such as the global position, for instance from a global positioning system and/or from map data, efficient planning and/or timing of the switching of state of the clutch arrangement may also be provided. Internal factors pertaining to the vehicle itself and/or external factors pertaining to the environment of the vehicle, such as traffic situation, road conditions etc. which may influence the safety may moreover be considered.

The method may further comprise: switching 218, when the vehicle is in motion, the clutch arrangement to the disengaged state such that the hydraulic pressure is solely caused by the first hydraulic pressure generated by the first hydraulic pump. The method may further comprise turning the engine off 220. A further reduction in energy consumption during transportation may thereby be provided. An improved fail-safe hydraulic power steering system may further be provided for providing power steering assistance to the driver of the vehicle even if the engine should be turned off.

In this third situation 406, i.e., when the vehicle 102 is in motion while the engine is turned off 220, the hydraulic pressure may be solely caused by the first hydraulic pressure generated by the first hydraulic pump. The switching 218 of the state of the clutch arrangement may alternatively be switching 219 to the engaged state. Such switching may be applied when it is desirable to utilize the first and the second hydraulic pumps for generating the hydraulic pressure. This may, for example, occur when the vehicle 102 is reaching the end of the longer downward slope 405 as in the fourth situation 408. The switching 219 to the engage state may be performed after turning on the engine 222. In other words, the method 200 may comprise turning on 222 the engine. In other examples the turning on 222 of the engine may be after or at the same time as the clutch arrangement is switched 219 to the engaged state.

The hydraulic power steering system 100 of the vehicle 102 may further comprise a transmission clutch arrangement, in mechanical contact with the engine and the transmission output shaft. The method 200 may then further comprise switching 224 the transmission clutch arrangement between an engaged state in which the engine and the transmission output shaft are in mechanical contact such that power from the engine is transmitted to the transmission output shaft and a disengaged state in which the transmission clutch arrangement is arranged to disengage power transmission from the engine to the transmission output shaft.

In situation 404, it may be favorable to switching 224 the transmission clutch arrangement. The vehicle 102 is entering a longer downward slope 405. The vehicle 102 may thereby freeroll. In other words, driveline drag pertaining to the propulsion system of the vehicle 102 may be eliminated when propulsion power is not needed as the vehicle 102 is rolling down the longer downward slope 405. An improved fail-safe hydraulic power steering system 100 may still be provided as the vehicle is in motion such that the hydraulic pressure may be caused solely by the first hydraulic pressure generated by the first hydraulic pump. A technical benefit may include efficient power steering assistance. In other words, the rotation of the driving wheels may solely drive the first hydraulic pump. A further technical benefit may include to provide a more energy efficient vehicle.

The method 200 may further comprise tuning off 226 the engine when the transmission clutch arrangement is in the disengaged state. For sake of completeness the method 200 may comprise turning the engine on 228. The turning on of the engine may be when the transmission clutch is in the disengaged state. The method 200 may further comprise switching the transmission clutch to the engaged state 230. The switching to the engaged state may be performed when power to propel the vehicle is needed. This may, for example, be in the situation 408.

FIG. 4B illustrates the vehicle 102 at standstill 301 at a loading area 302. The vehicle 102 then steers along a trajectory 304 to dock at the loading area 302. For such a situation 410 the hydraulic power system 100 may be configured such the clutch arrangement is in the engaged state. The engine may further be in operation. The hydraulic pressure may then be solely caused by the second hydraulic pressure generated by the second hydraulic pump when the vehicle is at standstill. A technical benefit may include providing efficient power steering assistance also when the vehicle 102 is at a standstill. To this end, the vehicle may be moving at a lower speed along the trajectory. As the engine is in operation and the clutch arrangement may further be configured in the engaged state, such that the hydraulic pressure is caused jointly by the first and second hydraulic pressure generated by the first and the second hydraulic pump.

Figure 5:
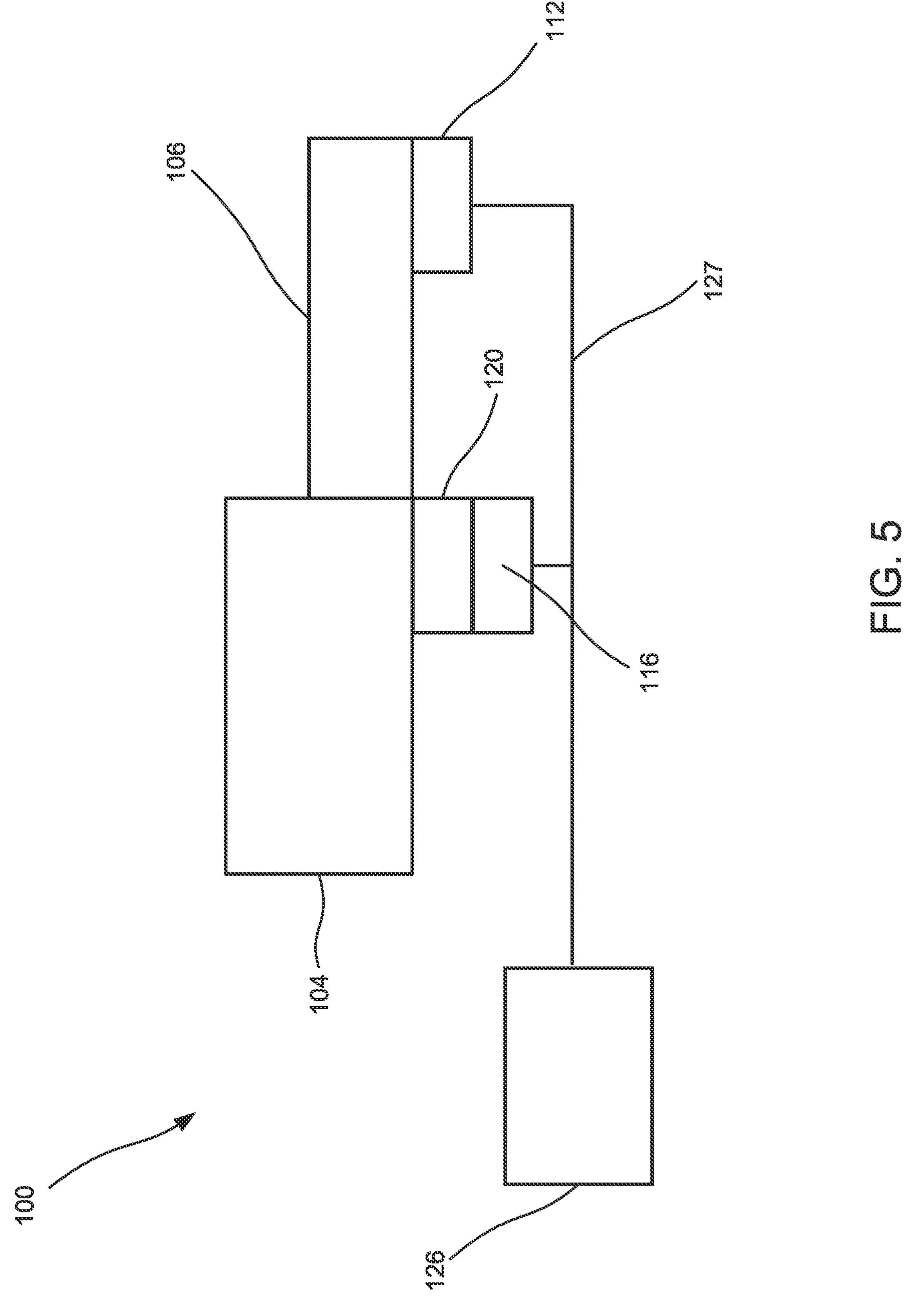
FIG. 5 illustrates a hydraulic power steering system for a vehicle according to another example.

FIG. 5 illustrates a hydraulic power steering system for a vehicle according to another example. FIG. 5 illustrates hydraulic power steering system 100 for a vehicle having an engine for propelling the vehicle and a transmission output shaft 106 for carrying power generated by the engine 104 to drive driving wheels of the vehicle, the system 100 comprising: a first hydraulic pump 112 arranged to be mechanically driven by the transmission output shaft 106 such that the first hydraulic pump 112 is driven by a rotation of the driving wheels when the vehicle is in motion such that a first hydraulic pressure is generated; a second hydraulic pump 116 arranged to be mechanically driven by power provided by the engine 104 such that a second hydraulic pressure is generated; a clutch arrangement 120 for mechanically connecting the second hydraulic pump 116 with the engine; the clutch arrangement being switchable between an engaged state in which the clutch arrangement 120 is arranged to transmit power from the engine 104 to drive the second hydraulic pump 116, and a disengaged state in which the clutch arrangement 120 is arranged to disengage power transmission from the engine 104 to the second hydraulic pump 116; and a hydraulic power steering arrangement 126 in fluid connection 127 with the first 112 and the second 116 hydraulic pump; wherein the hydraulic power steering arrangement 126 is arranged to be connected to a steering system of the vehicle to amplify steering input exerted by a driver of the vehicle to a steering wheel of the steering system by applying a hydraulic pressure provided by the first and/or second hydraulic pressure to the hydraulic power steering arrangement 126.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising." "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A hydraulic power steering system for a vehicle having an engine for propelling the vehicle and a transmission output shaft for carrying power generated by the engine to drive driving wheels of the vehicle, the system comprising:

a first hydraulic pump arranged to be mechanically driven by the transmission output shaft such that the first hydraulic pump is driven by a rotation of the driving wheels when the vehicle is in motion such that a first hydraulic pressure is generated;

a second hydraulic pump arranged to be mechanically driven by power provided by the engine such that a second hydraulic pressure is generated;

a clutch arrangement for mechanically connecting the second hydraulic pump with the engine, the clutch arrangement being switchable between an engaged state in which the clutch arrangement is arranged to transmit power from the engine to drive the second hydraulic pump, and a disengaged state in which the clutch arrangement is arranged to disengage power transmission from the engine to the second hydraulic pump, wherein the clutch arrangement is in the disengaged state, and wherein the hydraulic pressure is solely caused by the first hydraulic pressure generated by the first hydraulic pump when the vehicle is in motion while the engine is turned off; and a hydraulic power steering arrangement in fluid connection with the first and the second hydraulic pumps; wherein the hydraulic power steering arrangement is arranged to be connected to a steering system of the vehicle to amplify steering input exerted by a driver of the vehicle to a steering wheel of the steering system by applying a hydraulic pressure provided by the first and/or second hydraulic pressure to the hydraulic power steering arrangement.

2. The hydraulic power steering system of claim 1, wherein the engine is a combustion engine.

3. The hydraulic power steering system of claim 1, wherein the clutch arrangement is a bi-stable clutch arrangement.

4. The hydraulic power steering system of claim 1, wherein the hydraulic power steering system further comprises an engine control system arranged control the switching between the engaged state and the disengaged state.

5. The hydraulic power steering system of claim 4, wherein the engine control system is arranged to receive a control signal from a control system of the vehicle, wherein the control signal is based on sensor data pertaining to a state of the vehicle and/or position data pertaining to a position of the vehicle and wherein the point in time for switching of state of the clutch arrangement is based on the control signal.

6. The hydraulic power steering system of claim 1, wherein the clutch arrangement is in the disengaged state, and wherein the hydraulic pressure is solely caused by the first hydraulic pressure generated by the first hydraulic pump when the vehicle is in motion.

7. The hydraulic power steering system of claim 1, wherein the clutch arrangement is in the engaged state, and wherein the engine is in operation, wherein the hydraulic pressure is combinedly caused by the first and second hydraulic pressure generated respectively by the first and second hydraulic pump when the vehicle is in motion.

8. The hydraulic power steering system of claim 1, wherein the vehicle further comprises a transmission clutch arrangement, in mechanical contact with the engine and the transmission output shaft, the transmission clutch arrangement being arranged to switch between an engaged state in which the engine and the transmission output shaft are in mechanical contact such that power from the engine is transmitted to the transmission output shaft and a disengaged state in which the transmission clutch arrangement is arranged to disengage power transmission from the engine to the transmission output shaft.

9. A vehicle comprising the hydraulic power steering system of claim 1.

10. A method for operating a hydraulic power steering system of a vehicle, the vehicle having an engine for propelling the vehicle and a transmission output shaft for carrying power generated by the engine to drive driving wheels of the vehicle, the method comprising;

generating a first hydraulic pressure by driving, when the vehicle is in motion, a first hydraulic pump, the first hydraulic pump being arranged to be mechanically driven by the transmission output shaft such that the first hydraulic pump is driven by a rotation of the driving wheels;

generating a second hydraulic pressure by driving a second hydraulic pump, the second hydraulic pump being mechanically driven by power provided by the engine; and amplifying steering input exerted to a steering wheel of the vehicle by a driver of the vehicle, by applying a hydraulic pressure caused by the first and/or second hydraulic pressure to a hydraulic power steering arrangement, the hydraulic power steering arrangement being in fluid connection with the first and the second hydraulic pumps;

wherein the hydraulic power steering system further comprises a clutch arrangement for mechanically connecting the second hydraulic pump with the engine, wherein the clutch arrangement is switchable between an engaged state in which the clutch arrangement is arranged to transmit power from the engine to drive the second hydraulic pump, and a disengaged state in which the clutch arrangement is arranged to disengage power transmission from the engine to the second hydraulic pump; wherein the method further comprises:

switching the clutch arrangement between the engaged state and the disengaged state; and switching, when the vehicle is in motion, and the engine is turned off, the clutch arrangement to the disengaged state such that the hydraulic pressure is solely caused by the first hydraulic pressure generated by the first hydraulic pump.

11. The method of claim 10, wherein the hydraulic power steering system further comprises an engine control system, the method further comprising:

receiving, a control signal from a control system of the vehicle, wherein the control signal is based on sensor data pertaining to a state of the vehicle and/or position data pertaining to a position of the vehicle by the engine control system; and switching the state of the clutch arrangement based on the control signal.

12. The method of claim 10, the method further comprising:

switching, when the vehicle is in motion, the clutch arrangement to the disengaged state such that the hydraulic pressure is solely caused by the first hydraulic pressure generated by the first hydraulic pump.

13. The method of claim 10, wherein the vehicle further comprises a transmission clutch arrangement, in mechanical contact with the engine and the transmission output shaft, wherein the method further comprises:

switching the transmission clutch arrangement being switch between an engaged state in which the engine and the transmission output shaft are in mechanical contact such that power from the engine is transmitted to the transmission output shaft and a disengaged state in which the transmission clutch arrangement is arranged to disengage power transmission from the engine to the transmission output shaft.

* * * * *